US008433798B2

(12) United States Patent
Smith et al.

(10) Patent No.: US 8,433,798 B2
(45) Date of Patent: Apr. 30, 2013

(54) ALTERING SOFTWARE BEHAVIOR BASED ON INTERNET CONNECTIVITY

(75) Inventors: Aaron J. Smith, Kenmore, WA (US); Kalpesh Patel, Redmond, WA (US); Tarik Soulami, Redmond, WA (US); Valentin Sliouniaev, Redmond, WA (US); Chih-Pin Benjamin Kao, Silver Springs, MD (US); Richard S. Eizenhoefer, Redmond, WA (US); Paul Cheng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 12/485,635

(22) Filed: Jun. 16, 2009

(65) Prior Publication Data

US 2010/0318629 A1 Dec. 16, 2010

(51) Int. Cl.
G06F 15/16 (2006.01)
G06F 15/173 (2006.01)
G06F 17/30 (2006.01)

(52) U.S. Cl.
USPC .............................. 709/225; 709/219; 726/7

(58) Field of Classification Search ................. 709/217, 709/219, 225; 705/901, 904–905; 726/7
See application file for complete search history.

(56) References Cited

U.S. PATENT DOCUMENTS

| | | | | |
|---|---|---|---|---|
| 4,685,055 A * | 8/1987 | Thomas | ............................ | 705/56 |
| 5,883,955 A * | 3/1999 | Ronning | ........................... | 705/52 |
| 5,903,647 A * | 5/1999 | Ronning | ........................... | 705/57 |
| 5,907,617 A * | 5/1999 | Ronning | ........................... | 705/52 |
| 5,940,504 A * | 8/1999 | Griswold | ......................... | 705/59 |
| 6,243,468 B1 * | 6/2001 | Pearce et al. | ................... | 380/255 |
| 6,606,657 B1 | 8/2003 | Zilberstein | | |
| 6,720,983 B1 | 4/2004 | Massaro | | |
| 7,089,425 B2 * | 8/2006 | Chan | ............................ | 713/189 |
| 7,353,205 B2 * | 4/2008 | Schull | ............................ | 705/51 |
| 7,353,207 B2 * | 4/2008 | Schull | ............................ | 705/58 |
| 7,363,318 B1 | 4/2008 | Dere | | |
| 7,472,286 B2 * | 12/2008 | Burkhardt et al. | ............. | 713/193 |
| 7,716,476 B2 * | 5/2010 | Burkhardt et al. | ............. | 713/167 |
| 7,849,511 B2 * | 12/2010 | Richardson et al. | ............ | 726/26 |
| 7,861,306 B2 * | 12/2010 | DeMello et al. | ................ | 726/26 |
| 2001/0044782 A1 * | 11/2001 | Hughes et al. | ................... | 705/59 |

(Continued)

OTHER PUBLICATIONS

The Software Answer, Determine if an Internet Connection is Present (www.thesoftwareanswer.com/determine-internet-connection/), Sep. 16, 2009.

*Primary Examiner* — Larry Donaghue
(74) *Attorney, Agent, or Firm* — Shook, Hardy & Bacon L.L.P.

(57) ABSTRACT

A system, a method, and computer-readable media are provided for altering behavior of software based on detection of an Internet connection. The system, method, and media detect when a computer has connected to the Internet or is capable of connecting to the Internet. This detection may include analyzing a connection history of the computer to the Internet, reporting in real-time when the computer establishes a connection to the Internet, or attempting to actively establish a connection with an Internet resource using the computer. A first set of software functionality may be disabled when a previously established connection with the Internet is identified, a real-time report of a connection with the Internet is generated, or a connection with the Internet resource is established. In addition, a second set of software functionality may be enabled when the first set of software functionality is disabled.

15 Claims, 4 Drawing Sheets

U.S. PATENT DOCUMENTS

| | | | |
|---|---|---|---|
| 2002/0120726 A1* | 8/2002 | Padole et al. | 709/222 |
| 2004/0143746 A1 | 7/2004 | Ligeti | |
| 2004/0215969 A1* | 10/2004 | Nance et al. | 713/191 |
| 2006/0059100 A1 | 3/2006 | Ronning | |
| 2007/0143222 A1* | 6/2007 | Chicks et al. | 705/59 |
| 2007/0150294 A1 | 6/2007 | Rusman | |
| 2007/0157195 A1* | 7/2007 | Gaa-Frost et al. | 717/174 |
| 2007/0177499 A1 | 8/2007 | Gavrilescu | |
| 2009/0049442 A1 | 2/2009 | Shimasaki | |
| 2009/0083710 A1* | 3/2009 | Best et al. | 717/120 |
| 2009/0253414 A1* | 10/2009 | Gosselin et al. | 455/414.1 |

* cited by examiner

ALTERING SOFTWARE BEHAVIOR BASED ON INTERNET CONNECTIVITY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Software piracy creates significant losses for software publishers worldwide. Preventing software piracy is even more complicated when the software is designed for high-security environments (e.g., a government agency or an R&D facility). The complication exists because the software must still function without enabling some traditional license enforcement features. With these license enforcement features disabled, the software becomes a prime target for commercialized piracy where it may be duplicated and sold without the knowledge or consent of the publisher.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

A software solution is provided that alters the licensed behavior of software based on detection of an Internet connection. This may be implemented by detecting when a computer has connected to the Internet or is capable of connecting to the Internet. This detection may include analyzing a connection history of the computer to the Internet, detecting in real-time when the computer establishes a connection to the Internet, or attempting to actively establish a connection with an Internet resource using the computer. A first set of software functionality may be disabled when a previously established connection with the Internet is identified, a real-time report of a connection with the Internet is generated, or a connection with an Internet resource is established. In addition, a second set of software functionality may be enabled when the first set of software functionality is disabled. The second set of software functionality may reduce, increase, or enhance the functionality of the software. Finally, disabling the first set of software functionality and enabling the second set of functionality may be performed without user intervention.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
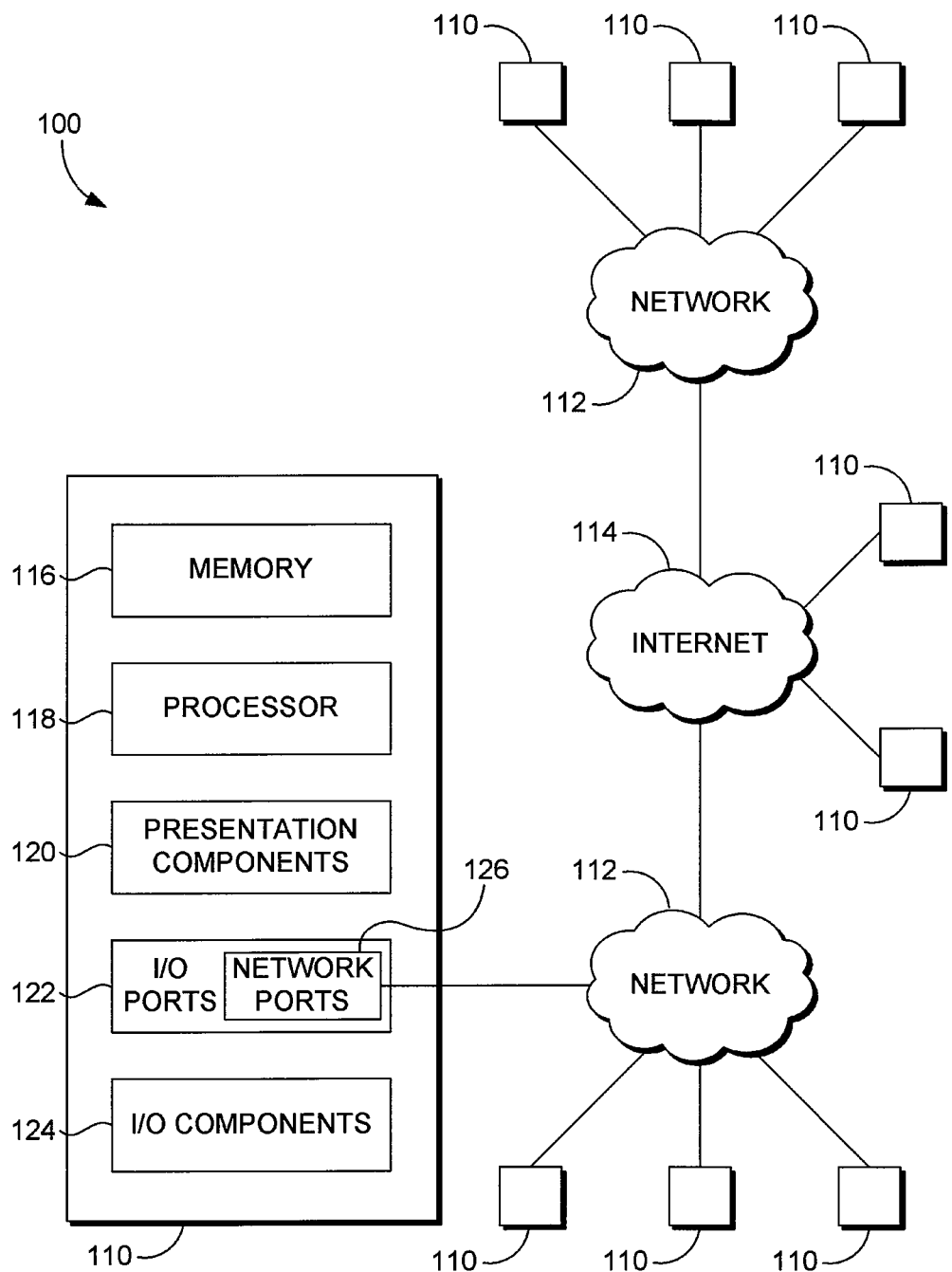
FIG. 1, depicts an operating environment suitable for practicing an embodiment of the present invention.

Turning now to FIG. 1, an exemplary operating environment for implementing embodiments of the present invention is provided and referenced generally by the numeral 100. Operating environment 100 may include a plurality of computing devices 110 in communication via network 112 and/or Internet 114. Operating environment 100 is but one example of a suitable computing environment and is not intended to suggest any limitation as to the scope of use or functionality of the invention. Neither should operating environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, specialty computing devices (e.g., cameras and printers), etc. The invention may also be practiced in distributed computing environments where tasks are performed by remote-processing devices that are linked through a communications network, such as network 112 or Internet 114.

With reference to FIG. 1, computing device 110 may include a bus that directly or indirectly couples the following elements: memory 116, a central processing unit (CPU) 118, one or more presentation components 120, input/output ports 122, input/output components 124. Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, CPUs have memory. The diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 110, network 112, and Internet 114 typically include a variety of computer-readable media or make use of devices that include computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices, or any other medium that can be used to encode desired information and be accessed by computing device 110, network 112, and/or Internet 114.

Memory 116 includes computer-storage media in the form of volatile and/or nonvolatile memory. The memory may be removable, nonremovable, or a combination thereof. Exemplary hardware devices include solid-state memory, hard drives, optical-disc drives, etc. Computing device 110 includes one or more processors 118 that read data from various entities such as memory 116 or I/O components 124. As discussed in more detail below, memory 116 may store software that is executed by processor 118. The software may include a number of components that are stored in memory 116 and executed by processor 118. In the alternative, these components may be stored remotely and executed locally by accessing processor 118 and memory 116.

Presentation component(s) 120 present data indications to a user or other device. Exemplary presentation components include a display device, speaker, printing component, vibrating component, etc. I/O ports 122 allow computing device 110 to be logically coupled to other devices including I/O components 124, some of which may be built in. Illustrative components include a microphone, joystick, game pad, satellite dish, scanner, printer, wireless device, etc. In addition, I/O ports 122 may include network ports 126 that allow computing devices 110 to communication with one another via network 112 and/or Internet 114.

Figure 2:
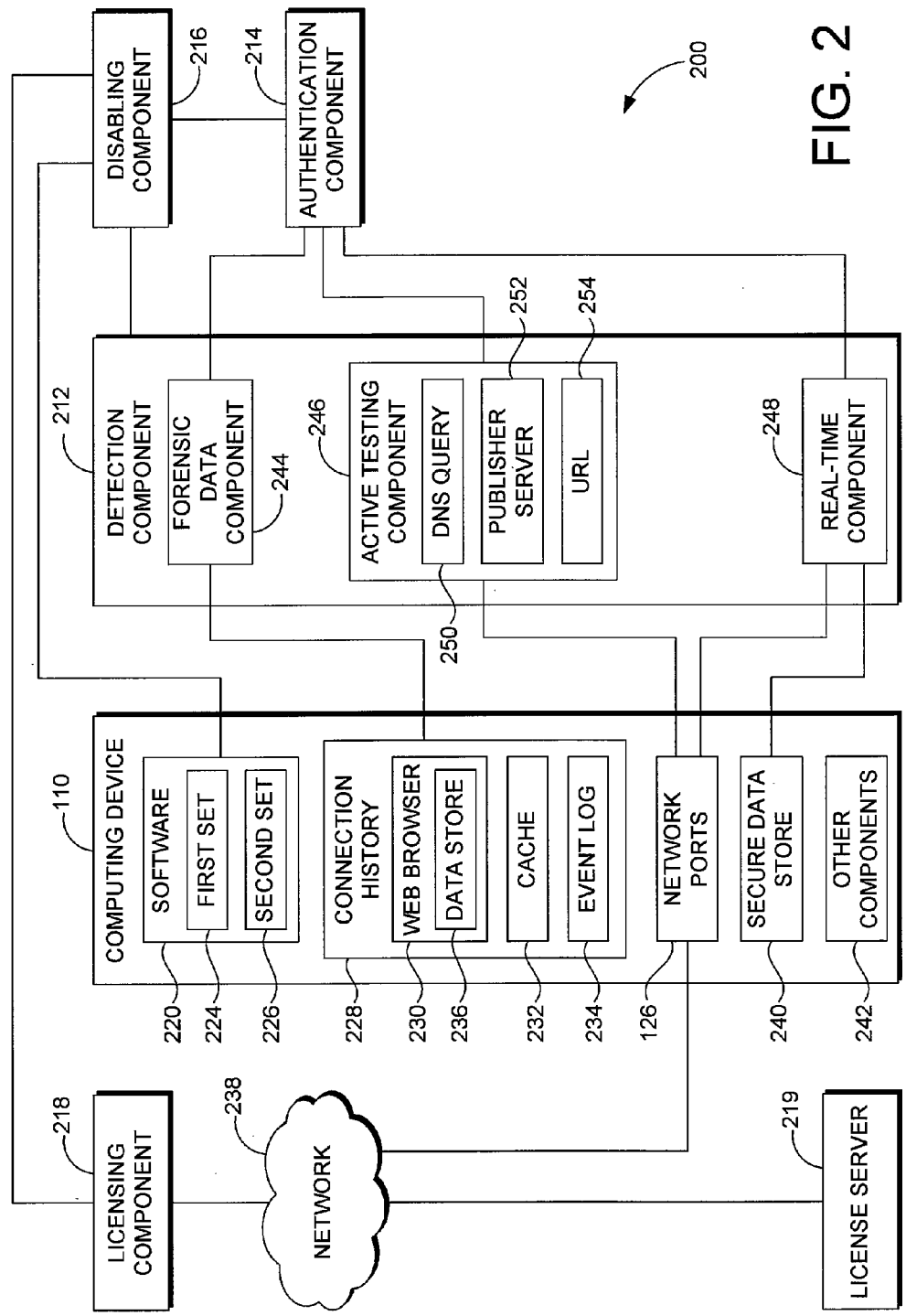
FIG. 2, depicts a block diagram of a computing environment suitable for implementing an embodiment of the present invention.

Turning now to FIG. 2, a block diagram of a computing environment suitable for implementing an embodiment of the present invention is provided and referenced generally by the numeral 200. Computing environment 200 may include computing device 110, detection component 212, authentication component 214, disabling component 216, and licensing component 218. Detection component 212, authentication component 214, disabling component 216, and licensing component 218 are illustrated as separate from computing device 110, but this is for illustration purposes only. Indeed, each of these components may be included within computing device 110 and stored locally in memory 116. In fact, each of these components may be included as components or modules of software 220. Likewise, each component may be stored remotely from computing device 110, or some of the components may be stored locally on computing device 110, while others may be stored remotely from computing device 110.

Computing device 110 includes software 220 that may be stored in memory 116 and executed by processor 118. Software 220 may include multiple feature sets and/or policies. For instance, software 220 may include a first feature set 224 and a second feature set 226. First feature set 224 may enable software 220 to operate with full functionality, where second feature set 226 may reduce the functionality of software 220. For example, software 220 may include a word processing or spreadsheet application. In this scenario, first feature set 224 might provide full functionality to a user. That is, the user could create new files, edit existing files, save files, etc. Likewise, second feature set 226 could reduce the functionality of software 220. For instance, second feature set 226 may only allow the user to view a file and not save any changes made to the file. Alternatively, second feature set 226 may enhance the functionality of software 220 by providing additional functionality not enabled by first feature set 224. In other words, embodiments of the present invention provide for an altered functionality mode which is not limited to reducing the functionality of software 220, and may actually provide additional functionality. In addition, second feature set 226 may be enabled for a "trial period" to encourage the user to obtain a license to gain access to this feature set. Finally, although two feature sets or policies are illustrated in FIG. 2, it is understood that embodiments of the present invention may include multiple feature sets (e.g., 3, 10, 20, 100, etc.) that may be enabled or disabled depending on detection of an Internet connection.

In addition to software 220, computing device 110 may include a connection history application or applications 228 that provide a history of past Internet connections or network connections. Such application may include a web browser 230, system cache 232, and event log 234. Web browser 230 may include a data store 236 that tracks and records history of websites visited by computing device 110. For example, Internet Explorer® and Firefox® include a browser history that provides a log of websites visited by a user of computing device 110. In sum, connection history application 228 may include any application containing a data store, folder, directory, or repository that provides a history or log of past Internet connectivity, and is not limited to the applications illustrated.

Besides web browsers, computing device 110 may include other network-enabled applications that directly or indirectly record connection history. For example, computing device 110 may also include a cache 232 that may be used for detecting evidence of Internet connectivity. Specifically, cache 232 may include an error cache that is only emptied when software 220 connects to the software publisher. For example, an application debugger may include information that provides evidence of Internet connectivity for a given application. It should be noted that even though cache 232 is illustrated within computing device 110, it is not so limited and may also be external to computing system 110. In addition, connection history applications 228 may include an event log 234 that may also be stored in memory 116 of computing device 110. Event log 234 may include any other sources of information stored by computing device 110 that record connection history.

As will be discussed in more detail below, the information collected from connection history applications provides one possible source for detecting an Internet connection. However, it may be desirable to evaluate or authenticate the trustworthiness of this data because often these data sources can be easily modified. For instance, it is not uncommon for a user to delete the browser history in a web browser. Thus, embodiments of the present invention may include both a forensic data component 244 that authenticates the data and/or an authentication component 214 that may not only authenticate the data obtained from application 228, but may also authenticate data obtained from other components and/or sources. One skilled in the art would appreciate that data stored on a computer may be a potential target for a malicious attack and may need to be verified or authenticated before being utilized. One way around this problem is to store this data in a secure data store, as will be discussed in more detail below. Ultimately, however, it is up to the publisher to decide what provides a reasonable level of protection for the given software.

As illustrated in FIGS. 1 and 2, computing device 110 may include network ports 126 that enable computing device 110 to connect to a network 238. The specifics of network 238 are not critical, other than its ability to provide Internet access for computing device 110 or communicate with another computing device that has access to the Internet. For instance the network may be a private, public, internal, or external network. Embodiments of the present invention will operate in any network environment and provide the advantage of operating in network environments in which other piracy prevention measures do not effectively operate in.

Computing device 110 may also include a secure data store 240 which may provide authenticated and encrypted data. For example, Secure Sockets Layer (SSL) is a Web protocol for establishing authenticated and encrypted sessions between a server and a client. Thus, an SSL connection is a trustworthy source of evidence of a possible Internet connection, with the caveat that the record of the SSL connection is stored securely. In other words, if an SSL log is not protected, then it can be easily deleted or modified. It must ne noted that SSL protocol is only one example of authentication-capable protocol and other protocols may be implemented (e.g., Transport Layer Security (TLS)). Thus, secure data store 240 provides an application a location for securely storing data from various sources and protocols that may be used to detect an Internet connection.

Finally, computing device 110 may include other components that may be implemented by embodiments of the present invention to detect Internet connectivity. These other components are illustrated by numeral 242. Again, FIGS. 1 and 2 are merely illustrative of an exemplary computing device that can be used in connection with one or more embodiments of the present invention. Embodiments of the present invention are not limited to the components illustrated and other components 242 may include any component, application, or hardware that may be used to alter the behavior of software based on detection of an Internet connection.

To detect an Internet connection, embodiments of the present invention may include detection component 212. Detection component 212 may be included in computing device 110 or may be external to computing device 110. In general, detection component 212 may include three main components. These components include forensic data component 244, active testing component 246, and real-time component 248. Each of these components focuses on different aspects or mechanisms for detecting an Internet connection. Forensic data component 244 focuses on data indicating a prior connection to the Internet. Active testing component 246 focuses on attempting to actively establish a connection with an Internet resource to indicate a capability of connecting to the Internet. Real-time component 248 focuses on reporting in real-time when an Internet connection is established.

As illustrated, each of these components may access or interact with computing device 110 and/or elements of computing device 110. Indeed, these components may be included as part of software 220 and stored in memory 116 of computing device 110. Further, each of these components may access and leverage the data stored on computing device 110 to determine if the device has connected to the Internet or is capable of connecting to the Internet. Each of these components will be discussed in more detail below. It should be noted, however, that embodiments of the present invention may include each component individually, employ a combination of different components, or employ all of the components as a collective set. Furthermore, other components 242 may be implemented with the ones disclosed to aid in the detection of an Internet connection. Finally, each of the components described or contemplated may be run in the background and performed without user intervention.

Forensic data component 244 is the first illustrated component that may be included as part of detection component 212. As discussed, forensic data component 244 focuses on analyzing the connection history of computing device 110 to the Internet to detect a previously established connection with the Internet. Specifically, forensic data component 244 may search or query connection history applications 228 for data indicating a prior connection. For example, forensic data component 244 may access data store 236 of web browser 230 and analyze the browser history stored by the application. Likewise, forensic data component 244 may search or query cache 232 of computing device 110 for traces of Internet connectivity. Similarly, forensic data component 244 may review event log 234 to determine if computing device 110 has connected to the Internet. Generally speaking, forensic data component is looking backwards in time and attempting to locate data indicating a previous connection to the Internet.

Active testing component 246 is the second illustrated component that may be included in detection component 212. As discussed, active testing component 246 focuses on attempting to actively establish a connection with an Internet resource. Active testing component 246 may attempt to establish this connection in a number of different ways. For example, active testing component 246 may send a DNS query 250 to resolve known Internet facing hosts stored on network 238 or computing device 110. One of ordinary skill in the art would appreciate that host names may be stored in a name server associated with network 238 or DNS resolver of computing device 110. If there is a record for an internet-facing host it may indicate a connection to the Internet. This is especially helpful if a DNS record is returned for a site that a user would not normally visit. For example, some DNS records may not be commonly accessed, but instead are published or related to a specific software application and accessed in the background. In other words, an application on computing device 110 may access a domain for updates or to obtain licensing data. This previous access may be evidenced by DNS query 250 even though the computing device is not currently connected to the Internet.

Active testing component 246 may also attempt to contact the publisher server 252 via network port 126 and network 238. This may be similar to a "call home" function used to prevent piracy in other software applications. It should be noted, however, that one difference is that the "call home" is not a prerequisite for enabling software 220. Instead it is used as one way of detecting an Internet connection. Indeed, an advantage of embodiments of the present invention is that they enable software to operate in an "air gap" or 100% disconnected environments which traditionally was not possible without disabling piracy protection features. That is, embodiments of the present invention provide piracy protection without limiting the operating environment. Moreover, the call home functionality of other software stored on computing device 110 and network 238 may be used to determine a previous Internet connection without requiring a call home functionality in software 220. Finally, active testing component 246 may attempt to connect to a URL 254 or ping a known IP address located external to network 238. A return of data or an establishment of a connection may indicate that computing device 110 is capable of connecting to the Internet.

Real-time component 248 is the third illustrated component that may be included in detection component 212. As discussed, real-time component 248 focuses on reporting in real-time when computing device 110 establishes a connection to the Internet. One way that real-time component 248 may report an Internet connection is via licensing component 218 that may contact a licensing server 219 via network 238. Another way real-time component 248 may report Internet connectivity is by monitoring one or more applications for Internet connectivity and storing a record of an Internet connection in a secure data store 240. For example, real-time component 248 may store a secure record of an SSL connection in secure data store 240. Again, secure data store 240 provides an extra level of security for the data utilized by detection component 212, but it is not an absolute requirement for embodiments of the present invention.

The data obtained by detection component 212 may be authenticated or verified via authentication component 214. As discussed, this may be important because the detection data may not be securely stored by applications running on computing device 110 and may be a prime target for a malicious attack. For example, data stored in secured data store 240 would generally be more trustworthy than data stored in data store 236 of web browser 230. However, that is not to imply that this is always the case or that embodiments of the present invention are limited to this hierarchy of trustworthiness. Moreover, data obtained by one component of detection component 212 may be more trustworthy than data obtained by another component in one computing environment, yet the opposite may be true in another computing environment. Thus, authentication component 214 provides a way to verify or authenticate the data for different environments and different components. For instance, any application, utility, service, or data source that is external to software 220 may be monitored for a historical or real-time Internet connection. Thus, authentication component 214 may be used to authenticate data obtained from a plurality of sources. In addition, data obtained by detection component 212 may be independently authenticated and bypass authentication component 214.

If an Internet connection is detected by detection component 212, then disabling component 216 may be engaged to alter functionality of software 220. For instance, disabling component 216 may be used to disable a first set of policies or feature sets 224. In addition, disabling component 216 may be used to enable a second set of policies or feature sets 226 when first feature set 224 is disabled. As discussed above, the second set of software functionality 226 may include a reduced set of software functionality or an increased set of software functionality. Again, disabling component 216 is illustrated as separate from computing device 110 and software 220, but this is for illustration purposes only. Indeed, disabling components may be included within computing device 110 as a component or module of software 220. Likewise, each component may be stored remotely from computing device 110, or some of the components may be stored locally on computing device 110, while others may be stored remotely from computing device 110.

Once software 220 is operating with an altered functionality (e.g., reduced, increased, or enhanced functionality) a user may be required to obtain licensing data to re-enable the first set of software functionality. This licensing data may be obtained via licensing component 218 that may be either stored locally or remotely from computing device 110. Alternatively, licensing data may be obtained through another source (e.g., via telephone) and installed on computing device 110 via licensing component 218 and/or disabling component 216. In addition, software 220 may operate with a reduced functionality for a limited period of time before it is completely disabled. In other words, once an Internet connection is detected, the user may be given a grace period before the first set of software functionality is altered or changed. Moreover, embodiments of the present invention are not limited only to licensing data and may require the user to comply with a set of rules before re-enabling the first set of software functionality. For example, the software publisher may require a hardware key, a new piece of hardware, a reboot, etc., to re-enable the first set of software functionality. Thus, receiving licensing data may be just one facet of complying with a set of rules established by a software publisher before re-enabling the first set of software functionality.

Figure 3:
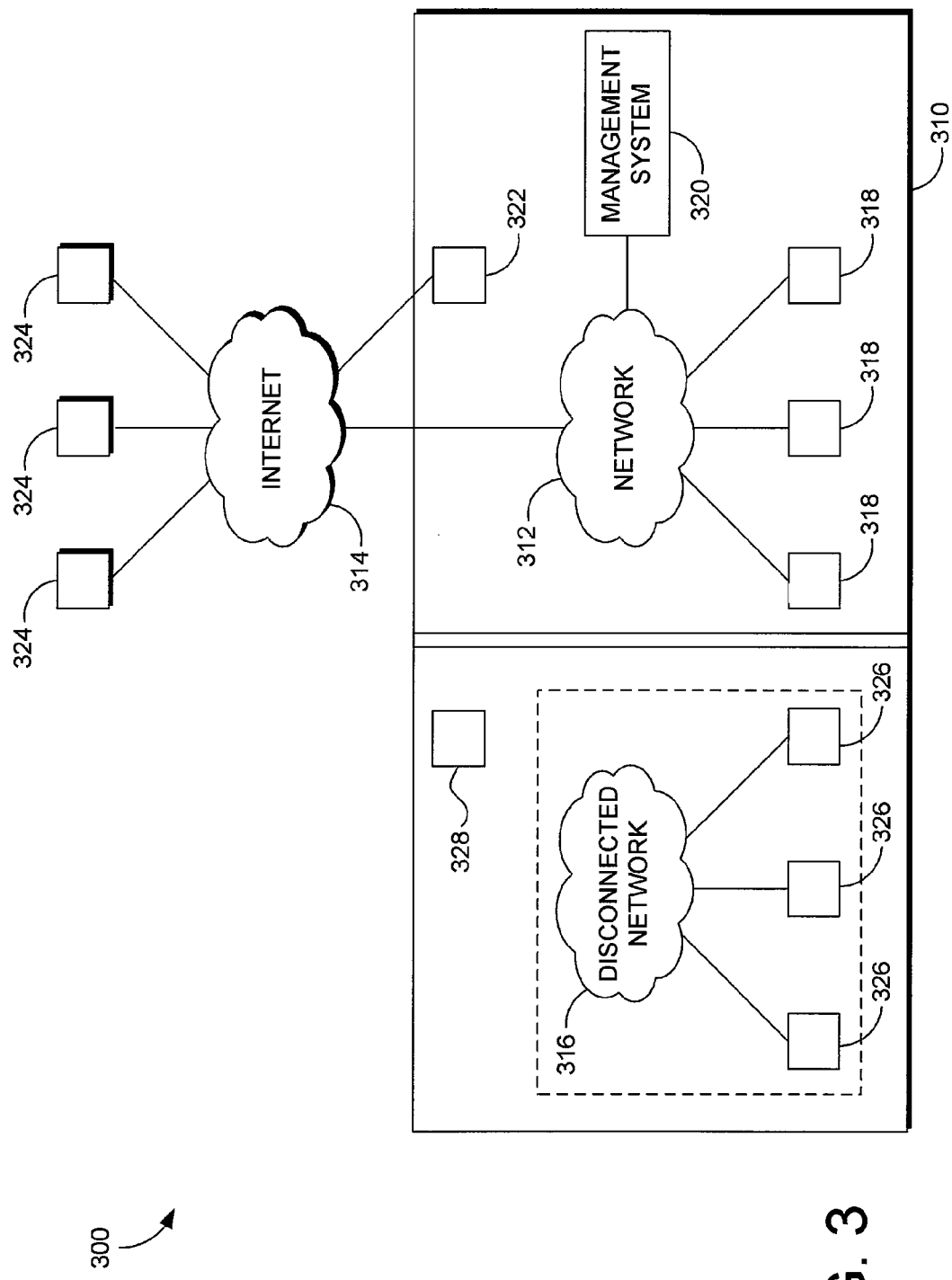
FIG. 3, depicts an operating environment suitable for practicing an embodiment of the present invention.

Turning now to FIG. 3, an operating environment suitable for practicing an embodiment of the present invention is provided and referenced generally by the numeral 300. Specifically, network operating environment 300 includes two distinct networks that may be in operation at a facility 310. This facility may represent a corporation or government agency that includes separate networks to provide an extra level of security for devices operating within the facility. For example, facility 310 may include network 312 that is connected to Internet 314 or is capable of connecting to Internet 314. This network would potentially be a greater security risk than network 316 which is a disconnected network and is not capable of connecting to Internet 314. In other words, network 312 enables computing devices 318 to communicate with other computing devices located external to network 312. For example, computing devices 318 are capable of connecting with computing devices 324 thereby exposing computing devices 318 from attacks from outside sources.

In addition, network 312 may include a management or administration system 320 to manage the network. Computing devices 318 may be in communication with a management system 320 via network 312. In addition, computing device 322 may be able to connect to Internet 314 without accessing network 312 (e.g., satellite network). This exposes another path for attacks that may occur if computing device 322 is connected to network 312. Thus, one aspect of management system 320 is to monitor against malicious attacks from sources outside of network 312.

In contrast, disconnected network 316 limits connections to computing devices 326 and not to any external computing devices. For example, computing devices 326 would not be able to communicate with computing device 328 because computing device 328 is not connected to network 316. Likewise, computing devices 326 would not be able to communicate with computing devices 318 or computing devices 324 located on Internet 314 because these devices are not connected to network 316. There may be a number of reasons or scenarios a publisher would like to provide software to these disconnected networks 316. For example, it may be desirable to offer full software functionality at a discounted rate in countries where Internet connectivity may not yet be available. The concern being that someone might decide to pirate the software and distribute in other locations around the world (i.e., copying and distributing it over the Internet). As discussed, one way to avoid this in the past was to require the software to "call home" as soon as it was installed. The problem with this approach is that it is not possible to call home in a disconnected environment. Thus, embodiments of the present invention maximize potential operating environments while still protecting against piracy. This is because the software functionality may be fully enabled in environments that do not have Internet connectivity but disabled in environments that do have Internet connectivity. Again, detection of an Internet connection and disablement of software functionality may be provided without any user intervention.

Another example of where air gap networks might be desirable is where computing devices 326 include highly confidential information, such as for a government agency or R&D facility. In these facilities, disconnected network 316 provides an extra level of protection from a malicious attack. However, similar to the disconnected environment discussed above, traditional "call home" anti-piracy measures prevented the software from operating in these disconnected environments. As before, software publishers incurred great risk if they disabled their piracy prevention features. For example, computing device 326 could be moved from disconnected network 316 to network 312 creating a risk that the software may be freely distributed to other devices on network 312. Thus, embodiments of the present invention not only detect when the computing device is connected to the Internet but may also monitor when the device is operating in a network environment that is connected to the Internet. For example, embodiments of the present invention may identify at least one other computer in the network environment that is connected to the Internet and enable a different set of features accordingly. In this scenario, any device that is connected to network 312 may be required to obtain licensing data in order to re-enable software functionality.

Embodiments of the present invention also offer an additional advantage of providing an alert when a disconnected network has been breached. For instance, management system 320 may be alerted when the software operating on computing device 326 is disabled due to the detection of an Internet connection. This would indicate that at some point one of the devices 326 located on disconnected network 316 connected to the Internet. For instance, if a user of a computing device 326 is connecting the device to the Internet to download or upload data, then embodiments of the present invention might detect this connection. This example also illustrates a scenario where authentication component 214 may be important. Specifically, if a user is able to give the appearance that device 326 has connected to the Internet then they could potentially disable software located on device 326 even though the device has never actually connected to the Internet. It is in these situations, that authentication component 214 may be of particular importance.

Figure 4:
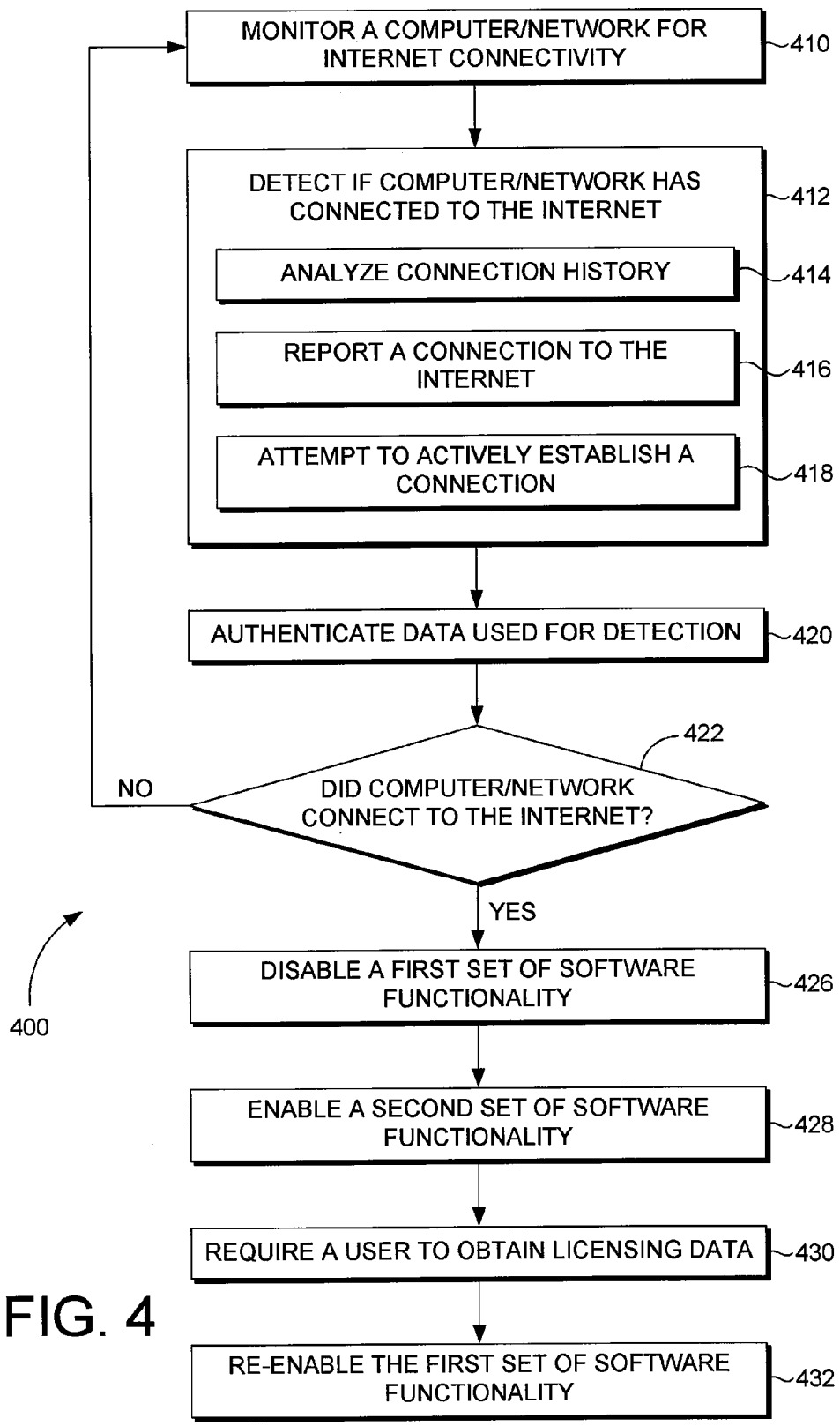
FIG. 4, depicts an illustrative method for altering a behavior of software based on detection of an Internet connection.

Turning now to FIG. 4, with reference to FIGS. 2 and 3, an illustrative method for altering a behavior of software based on detection of an Internet connection has been provided and referenced generally by the numeral 400. At a step 410, a computing device and/or network may be monitored for Internet connectivity. For example, computing device 318, 326 and/or network 312, 316 may be monitored for connections to Internet 314. Thus, at a step 412, embodiments of the present invention attempt to detect if the computer and/or network has connected to the Internet or is capable of connecting to the Internet. As discussed, this can be done in a number of ways. For example, at a step 414, connection history of the computer and/or network maybe analyzed. As discussed, one way this may be implemented is via forensic data component 244. Likewise, at a step 416, another option for detecting Internet connectivity is provided that includes reporting a connection to Internet. As discussed, one way this may be implemented is via real-time data component 248. In addition, at a step 418, another option for detecting Internet connectivity is provided that includes attempting to actively establish a connection to an Internet resource. As discussed, one way this may be implemented is via active testing component 246.

At a step 420, the data obtained during the detection step may be authenticated. One way this may be implemented is via authentication component 214. Again authentication may be more important for some environments than it is for others. Thus, embodiments of the present invention contemplate different levels of authentication, and some contemplate no authentication at all. At a step 422, the data is processed and it is determined if the computing device and/or network is connected to the Internet or is capable of connecting to the Internet. If Internet connectivity was not detected, then the method returns to step 410 and repeats the detection process.

At a step 426, a first set of software functionality is disabled when an Internet connection is detected. As discussed, one way this may be implemented is via disabling component 216. At a step 428, a second set of software functionality may be enabled when the first set of functionality is disabled. The second set of software functionality may require production activation, and the related license constraints may be completely independent from the first set. As discussed, one way this may be implemented is via disabling component 216. At a step 430, a user is required to obtain licensing data to re-enable the first feature set. This may be implemented by either disabling component 216 or licensing component 218. Once the licensing data is obtained the first set of software functionality may be re-enabled at a step 432.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Computer-readable storage media storing computer-executable instructions that, when executed, perform a method of altering a behavior of software based on detection of an Internet connection, the method comprising:

detecting when a first computer has connected to an Internet or is capable of connecting to the Internet, wherein said detecting includes attempting to actively establish a connection with an Internet resource using said first computer; and disabling a first set of software functionality for a second computer in communication with said first computer when said connection with an Internet resource using said first computer is established.

2. The media of claim 1, further comprising enabling a second set of software functionality for said second computer when said first set of software functionality is disabled.

3. The media of claim 2, wherein said second set of software functionality reduces the functionality of said software.

4. The media of claim 1, further comprising requiring a user to obtain licensing data to re-enable said first set of software functionality.

5. The media of claim 1, further comprising requiring said second computer to obtain licensing data within a period of time from when said first set of functionality is disabled, and when said period of time expires, disabling all software functionality on said second computer.

6. The media of claim 1, wherein detecting when said first computer has connected to the Internet or is capable of connecting to the Internet is performed without user intervention.

7. The media of claim 1, wherein detecting when a first computer has connected to the Internet or is capable of connecting to the Internet includes authenticating data that indicates an active connection with said Internet.

8. The media of claim 1, wherein attempting to actively establish a connection with an Internet resource includes sending a DNS query for an Internet-facing host.

9. The media of claim 1, further comprising alerting a management system when said first set of software functionality is disabled.

10. A system for altering software behavior based on detection of an Internet connection, said system comprising:
- a detection component configured to determine if a first computer has connected to an Internet or is capable of connecting to the Internet, wherein said detection component includes an active-testing component configured to attempt to establish a connection with an Internet resource using said first computer;
- a disabling component configured to disable a first set of software functionality in a second computer when said detection component detects said first computer has connected to the Internet or is capable of connecting to the Internet; and
- a licensing component configured to re-enable said first set of software functionality in said second computer when licensing data is obtained for said second computer.

11. The system of claim 10, wherein said disabling component is further configured to enable a second set of software functionality in said second computer when said first set of software functionality is disabled.

12. The system of claim 10, wherein said active-testing component is stored remotely from said first computer.

13. The system of claim 10, wherein said active-testing component accesses other components stored on said first computer to determine if said first computer has connected to the Internet or is capable of connecting to the Internet.

14. A computer-implemented method for altering behavior of software based on detection of a connection to an Internet, said method comprising:
- detecting software operating in a network environment that is connected to the Internet by identifying at least one computer in said network environment that has connected to the Internet or is capable of connecting to the Internet;
- in response to said detection, instructing said software to operate in accordance with an altered functionality mode on at least one other computer, wherein one or more functions of said software are disabled in said altered functionality mode; and
- re-enabling said one or more functions of said software incident to detecting compliance with a set of rules associated with said software.

15. The method of claim 14, wherein detecting said software is operating in a network environment that is connected to the Internet is performed without user intervention.

* * * * *